United States Patent [19]
Hotta et al.

[11] Patent Number: 5,382,624
[45] Date of Patent: Jan. 17, 1995

[54] POLYMER PARTICLES AND METHOD FOR PRODUCING THE SAME

[75] Inventors: Yasunari Hotta; Satoshi Maeda; Yozo Yamada; Shinichiro Mori; Toshio Tanaka, all of Ootsu; Koji Tanaka; Hiroshi Ono, both of Okayama, all of Japan

[73] Assignee: Toyo Boseki Kabushiki Kaisha, Japan

[21] Appl. No.: 118,782

[22] Filed: Sep. 10, 1993

Related U.S. Application Data

[63] Continuation of Ser. No. 748,763, Aug. 23, 1991, abandoned.

[30] Foreign Application Priority Data

Aug. 27, 1990 [JP] Japan .................................. 2-226376

[51] Int. Cl.$^6$ ...................... C08L 67/02; C08L 67/04; C08L 67/06
[52] U.S. Cl. ........................................ 525/10; 525/44; 525/411; 525/412; 525/415; 525/437; 525/445; 525/446; 523/501; 523/502; 430/109
[58] Field of Search ...................... 523/501, 502, 539; 525/10, 44, 445, 411, 412, 437, 446, 415

[56] References Cited

U.S. PATENT DOCUMENTS

| | | | |
|---|---|---|---|
| 4,191,672 | 3/1980 | Salome | 523/502 |
| 4,413,073 | 11/1983 | Gibson | 523/511 |

OTHER PUBLICATIONS

M. Okubo et al., "Preparation of Micron–Size Monodisperse Polymer Microspheres Having Crosslinked Structures and Vinyl Groups," Colloid Polym. Sci. 269:217-221 (1991).

*Primary Examiner*—Patricia A. Short
*Attorney, Agent, or Firm*—Wegner, Cantor, Mueller & Player

[57] ABSTRACT

Spherical resin particles having a sharp particle size distribution and a method for producing such particles are disclosed. Resin particles according to this invention contain at least a polyester polymer and a polymer formed from a polymerizable monomer, and have an average diameter (D) of 1 to 500 μm. At least 70% by weight of the particles have a diameter in the range of 0.5 D to 2.0 D. Such resin particles can be produced by swelling polyester-containing seed particles with a polymerizable monomer and then polymerizing the polymerizable monomer in swelled seed particles.

7 Claims, No Drawings

POLYMER PARTICLES AND METHOD FOR PRODUCING THE SAME

This application is a continuation of U.S. application Ser. No. 07/748,763 filed Aug. 23, 1991, now abandoned.

BACKGROUND OF THE INVENTION

This invention relates to polymer particles, in particular, spherical resin particles having a narrow particle size distribution in micron order, and to a process for producing the same.

In recent years, polymer particles or polymer beads have been put into wide use as matting agents, blocking-preventive materials, organic pigments, gel for chromatography, powder paints and varnishes, gap-adjusting materials, toners for electrophotography, cosmetics, and the like. Polymer particles used for such purposes are required to have a narrow particle size distribution with particle diameters ranging from about 0.1 to about 100 um.

Among hitherto known methods for preparing resin particles usable for such purposes are included emulsion polymerization, suspension polymerization, seeded polymerization and dispersion polymerization methods.

Emulsion Polymerization

Emulsion polymerization is a method in which micelles of polymerizable monomers stabilized by a surfactant are subjected to polymerization to obtain polymer particles.

According to the method, particles having a sharp particle size distribution can be obtained. However, the diameter of the particles is decided by the size of the micelles which exist in a stable manner. Because of this, the diameter of particles is confined to the range of from ca. 0.01 to ca. 0.5 um, and it is hardly possible to prepare particles having a diameter of ca. 1 um or above. In addition, surfactants, which are essential for the stabilization of micelles, remain on the surface of particles so prepared, thus limiting the applicable uses of the resin particles. Besides, such particles are too small to be used as solid particles.

Suspension Polymerization

Suspension polymerization is method for obtaining particles by polymerizing polymerizable monomers in a suspension prepared by stirring a mixture of water and the polymerizable monomers.

In this method, it is not easy to form a stable suspension system which can be polymerized stably. In addition, it is difficult from technical point of view to obtain fine polymer particles having a uniform particle size distribution. This is because undesirable coalescence of particles often takes place during their formation.

For this reason, a suspension-stabilizing agent is used in suspension polymerization to prevent particles from coalescence and to stabilize the polymerization. As suspension-stabilizing agents, use is generally made of sparingly soluble inorganic compounds, such as barium sulfate, calcium sulfate, magnesium carbonate, barium carbonate, calcium carbonate and calcium phosphate; metal oxides, such as silica, calcia, magnesia and titanium oxide; minerals, such as diatomaceous earth, talc, clay and kaolin; mixtures of these; or aqueous mixtures of such polymers as polyvinyl alcohols, gelatins and starches.

Even when such suspension-stabilizing agents are used, the actual diameter of particles prepared by suspension polymerization is in the order of about tens of um or above, and a broad particle size distribution is resulted. Because of this, particles produced by this method require a post treatment, such as classification, so as to attain the required particle size distribution.

Seeded Polymerization

The seeded polymerization method has been proposed to solve the above-mentioned problems. In this method, particles obtained by another method are used as seed particles. The seed particles are swelled with solvents and a polymerizable monomer, and the resultant particles are allowed to grow by polymerizing the monomers in the swelled particles.

According to the seeded polymerization method, it is possible in principle to obtain particles having a sharp particle size distribution if seed particles having appropriate particle sizes are selected, and the diameter of particles so produced can be controlled by regulating the swelling rate of the seed particles.

The seeded polymerization was originally devised for the purpose of producing particles having a diameter in the range between (i) 0.01 to 0.5 $\mu$m, which can be attained by emulsion polymerization, and (ii) several tens of $\mu$m, which can be attained by suspension polymerization. Accordingly, as a matter of fact, particles usable as seed particles in the industrial seeded polymerization are often limited to particles obtained by emulsion polymerization, namely, particles of vinyl polymers.

It is however difficult to swell vinyl polymer particles with polymerizable monomers. The swelling ratio is decided by the interaction between the polymer composing the seed particles and the monomers used for the swelling, and by the balance of surface tension of the swelled particles. Thus, the actual swelling ratio is limited to 2 to 10 times at best.

In other words, the swelling ratio could not be increased to an extreme extent, and hence the growth of particle size which can be attained at one time has a limit of its own. Ten times increase in the particle size corresponds to 1,000 folds increase in the volume. To achieve an increase of this magnitude, seeded polymerization must be effected repeatedly.

Two-stage swelling seeded polymerization method has been developed with intention to increase the swelling ratio of seed particles. In this method, seed particles are swelled with, e.g., an oligomer or a sparingly soluble low molecular substance (a swelling agent), and the resultant particles are then further swelled with polymerizable monomers. By this method, the swelling ratio of the seed particles can be increased to several thousand folds. However, the swelling agent used for the two-stage swelling seeded polymerization remains in the particles so prepared, and hence an additional step is required to remove the agent.

Although the seeded polymerization can be excellent in that resin particles having a sharp particle size distribution of the order of microns can be prepared, the fore-going problems prevent the seeded polymerization method from being commercially employed.

Dispersion Polymerization

Dispersion polymerization is a method in which a polymerizable monomer, an initiator and a stabilizer are dissolved in an organic solvent to initiate polymerization, and the aggregates of oligomers generated in the initial stage of polymerization are utilized as cores for the growth of polymer particles insoluble to organic solvent.

Although dispersion polymerization can be excellent as a method for preparing resin particles of the order of microns having a sharp particle size distribution, it is hardly possible in most cases to practice the method on a commercial scale since an organic solvent must be used as the medium for growing polymer particles.

In particular, composite particles of a polyester polymer and a vinyl polymer can be prepared only by means of suspension polymerization, in which a polyester resin is dissolved into vinyl monomers, followed by the granulation and polymerization thereof. In this case, however, there are resulted particles having a broad particle size distribution since the size of the particles depends on the conditions of mechanical stirring. Because of this, no hitherto known composite particles consisting of polyester and vinyl polymers have a sharp particle size distribution.

As mentioned hereinabove, the prior methods, in particular, commercially available methods for producing resin particles have restrictions on the range of producible particle size, and there can be obtained resin particles having only a broad particle size distribution. On the other hand, hitherto known methods capable of producing resin particles having a sharp particle size distribution could hardly be practiced industrially.

In view of the above, the present inventors have conducted intensive studies to develop a method which enables to industrially produce resin particles having any desired particle size and, at the same time, a sharp particle size distribution, and as a result have arrived at this invention.

This invention is concerned with resin particles characterized in that they contain at least a polymer of a polymerizable monomer (vinyl monomer and/or ring-opening polymerizable monomer) and a polyester polymer, the average particle diameter (D) of said particles being 1 to 500 μm and at least 70% by weight of said particles having a diameter in the range of 0.5 D to 2.0 D.

This invention is also concerned with a method for producing such resin particles, which comprises preparing substantially spherical resin particles which have an average particle diameter (d) of 0.1 to 50 μm, consist mainly of a polyester and are dispersed in an aqueous medium; swelling said resin particles (seed particles) with a polymerizable monomer (vinyl monomer and/or ring-opening polymerizable monomer); and then polymerizing said monomer to form resin particles having an average particle diameter (D) of 1 to 500 μm and containing at least said polyester and a polymer formed from said polymerizable monomer.

Accordingly, there are provided by this invention a kind of seeded polymerization method which utilizes novel seed particles, and novel resin particles obtainable by the method.

In the practice of this invention, it can be preferable to use seed particles consisting of substantially spherical polyester resin particles having an average diameter (d) of 0.1 to 50 μm, at least 70% by weight of said particles having a diameter in the range of 0.5 D to 2.0 D and at least 70% by weight of said particles having a sphereness (ratio of short diameter to long diameter) of 0.7 or above.

As examples of processes for preparing such particles, mention may be made of the followings:

(1) A method in which an aqueous dispersion consisting mainly of an ionic group-containing polyester resin is first prepared, and vinyl monomers containing ionic groups which are counter ionic against the ionic groups contained in the resin are added to the aqueous dispersion up to an equivalent ratio of 0.5 or above, based on ionic groups, followed by the polymerization thereof.

(2) A method in which a polyester containing —COOH, —COONa, —COONH$_4$ in the range of from 0.02 to 2.0 equivalents/1,000 g is dispersed in a liquid medium to form a dispersion system containing dispersed particles having an average diameter (d) of 0.1 μm or less; vinyl monomers containing ionic groups which are counter ionic against carboxylic groups contained in said polyester; and the monomers are then polymerized to form spherical particles having an average particle size of 0.1 to 50 μm and consisting mainly of said polyester and a polymer of said vinyl monomers.

(3) A method in which an ionic group-containing polyester is subjected to micro-dispersion in an aqueous medium to form micro-dispersed particles having an average diameter of 0.1 um or less; the micro-dispersed particles are rendered into a plasticized state; and the amount of ions in the microdispersion system is changed in a uniformly controlled manner by adding with stirring an ion-containing compound and/or an electrolyte (including high polymer electrolytes) to allow the micro-dispersed particles to coalesce and form resin particles having an average particle side (D) of 0.1 to 50 μm.

Examples of polyester resins usable in this invention include those consisting mainly of dicarboxylic acid components and glycol components.

As examples of usable dicarboxylic acid components, mention may be made of aromatic dicarboxylic acids, such as terephthalic acid, isophthalic acid, orthophthalic acid and 1,5-naphthalic acid; aromatic hydroxycarboxylic acid, such as p-hydroxybenzoic acid and p-(hydroxyethoxy)benzoic acid; aliphatic dicarboxylic acids, such as succinic acid, adipic acid, azelaic acid, sebacic acid and dodecanedicarboxylic acid; unsaturated aliphatic acids, such as fumaric acid, maleic acid, itaconic acid, hexahydrophthalic acid and tetrahydrophthalic acid; and alicyclic dicarboxylic acids. A small quantity of tri- and tetra-carboxylic acids, such as trimellitic acid, trimesic acid and pyromellitic acid, may be additionally contained as an acid component.

As examples of usable glycol components, mention may be made of diols, such as ethylene glycol, propylene glycol, 1,3-propanediol, 1,4-butanediaol, 1,5-pentanediol, 1,6-hexanediol, neopentyl glycol, diethylene glycol, dipropylene glycol, 2,2,4-trimethyl-1,3-pentanediol, 1,4-cyclohexane dimethanol, diols having a tricyclodecane skeleton, spiro glycols, 1,4-phenylene glycol, ethylene oxide adducts of 1,4-phenylene glycol, polyethylene glycol, polypropylene glycol and polytetramethylene glycol; ethylene oxide adducts and propylene oxide adducts of bisphenol A; and ethylene oxide adducts and propylene oxide adducts of bisphenol A.

In addition to the above, there may be contained, where necessary, a small amount of triols and tetraols, such as trimethylol ethane, trimethylol propane, glycerol and pentaerythritol.

There may also be contained polyester polyols, for example, lactone polyester polyols obtainable by ring-opening polymerization of lactones, such as e-caprolactone or the like.

Examples of ionic groups which may be contained in the polyester resin include anionic groups, such as carboxyl, sulfonic, sulfonyl and phosphoric groups, and salts thereof; and cationic groups, such as primary, secondary and tertiary amino groups. Of these groups, metal salts of sulfonic groups and ammonium salts of carboxylic groups can be preferable. Metal salts of sulfonic groups can be most preferable.

As examples of sulfonic acid's metal salt-containing aromatic dicarboxylic acids copolymerizable with a polyester, mention may be made of metal salts of o-sulfobenzoic acid, m-sulfobezoic acid, p-sulfobenzoic acid, sulfoterephthalic acid, 5-sulfoisophthalic acid, 4-sulfoisophthalic acid, 4-sulfonaphthalene-2,7-dicarboxylic acid and 5[4sulfophenoxy]isophthalic acid. As examples of metals which may form salts with the aromatic dicarboxylic acids and monocarboxylic acids such as o-, m- and p-sulfobenzoic acids, mention may be made of Li, Na, K, Mg, Cu and Fe. 5-Sodium sulfoisophthalic acid can be particularly preferred.

There is no restriction on the amount off the sulfonic acid's metal salt-containing aromatic dicarboxylic acids to be used, provided that the desired aqueous dispersion can be obtained. However, it is generally preferable to use the compounds in an amount in the range of 0.02 to 0.5 equivalents/1,000 g.

In this invention, the polyester resin can be used either individually or in the form of a mixture of two or more of them. The resins may also be used in combination with an amino resin, an epoxy resin, an isocyanate compound or the like in a molten state or in the state of a solution. It is also possible to allow the mixture to react partially. The resultant partial reaction product can be used as a raw material for the aqueous dispersion.

The aqueous dispersion consisting mainly of an ionic group-containing polyester resin according to this invention can be prepared in any of the known methods. For example, a polyester resin may be admixed with a water-soluble organic compound at 50° to 200° C., and the resulting mixture may be added to water or vise versa, followed by the mixing thereof at 40° to 120° C. Alternatively, a polyester resin may be added to a mixture of water and a water-soluble organic compound, and the resulting mixture may be stirred at 40° to 100° C. to make a dispersion.

By "Vinyl monomers containing counter ionic groups" is herein meant vinyl monomers containing ionic groups opposite to the ionic groups contained in the polyester resin (namely, the counter ionic groups will be cationic in the case where anionic groups are contained in the polyester resin, and will be anionic in the case where cationic groups are contained in the polyester resin). Such ionic groups are required in order to form a stable aqueous dispersion of the polyester.

The equivalent ratio of the counter ionic groups contained in the polymer formed from polymerizable vinyl monomers to the ionic groups contained in the polyester resin is 0.5 or above, preferably in the range of 0.5 to 20, more preferably in the range of 0.8 to 2.0. If the ratio is less than the above lower limit, it will become difficult to coalesce fine particles to grow larger particles. When the ratio is too high, no further improvements can be attained with regard to the growth of the fine particles and, moreover, there are often resulted an undesirable lowering in resistance to water.

As examples of usable cationic group-containing vinyl monomers, mention may be made of 2-aminoethyl (meth)acrylate, 2-N,N-dimethylaminoethyl (meth)acrylate, 2-N,N-diethylaminoethyl (meth)acrylate, 2-N,N-dipropylaminoethyl (meth)acrylate, 2-N-t-butylaminoethyl (meth)acrylate, 2-(4-morpholino)ethyl methacrylate, 2-vinylpyridine, 4-vinylpyridiene and aminostyrene.

As examples of usable anionic group-containing vinyl monomers, mention may be made of carboxylic group-containing monomers, such as (meth)acrylic acid, itaconic acid, crotonic acid, maleic acid, fumaric acid, and salts thereof; sulfonic group-containing monomers, such as styrenesulfonic acid, vinyltoluenesulfonic acid, vinylethylbenzenesulfonic acid, isopropenylbenzenesulfonic acid, 2-chlorostyrenesulfonic acid, 2-methyl-4-chlorostyrenesulfonic acid, vinyloxybenzenesufonic acid, vinylsulfonic acid, (meth)acrylsulfonic acid, sulfoethyl or sulfopropyl ester of (meth)acrylic acid, 2-acrylamido-2-methylpropanesulfonic acid, and salts thereof; and phosphoric group-containing monomers, such as azidophosphoxyethyl (meth)acrylate, azidophosphoxypropyl (meth)acrylate, 3-chloro-2-azidophosphoxypropyl methacrylate, bis(meth)acryloxyethyl phosphate, vinyl phosphate, and salts thereof.

A combination of a cationic group-containing vinyl monomer and an anionic group-containing polyester can be preferable for attaining the objects of this invention. It is also possible to additionally use known nonionic monomers in appropriate quantities.

There is no particular restriction on the kind of initiators to be used for the polymerization of vinyl monomers. As examples of usable initiators, mention may be made of organic peroxides, such as benzoyl peroxide and acetyl peroxide; azo compounds, such as 2,2'-azobisisobutylonitrile and 2,2'-azobis(2,4-dimethylvaleronitrile); inorganic peroxides, such as persulfates, hydrogen peroxide and permanganates; and water-soluble redox initiators consisting of a combination of one of the above inorganic peroxides with a reductant, such as sulfites, bisulfites, metasulfites, hydrosulfites, thiosulfates, iron salts and oxalic salts. Water-soluble redox initiators can be preferable from the viewpoint of safety and industrial feasibility. The initiators are used in general in an amount of from 0.1 to 3% by weight, based on the weight of vinyl monomers.

It is difficult to show a general temperature range applicable to the polymerization. It can however be preferable to carry out the polymerization at a temperature higher than the glass transition point (Tg) of the polyester resin, so as to make it possible to grow spherical particles by coalescing the fine polyester resin particles dispersed in an aqueous medium as the polymerization of the vinyl monomers proceeds. When the polymerization is carried out at a temperature lower than the glass transition point, there are often resulted undesirable formation of irregular particles. It is also possible to lower the apparent glass transition point (or lowest film-forming temperature) of the polyester resin by using a solvent or a plasticizer for the resin and to carry out the polymerization at a temperature lower than the apparent glass transition point. There is no restriction on the kinds of solvent and plasticizers to be used, and any known solvents and plasticizers can be used, provided that the polymerization is not impaired by them.

Other conditions of the polymerization can be the same as in the conventional methods. It can be preferable to carry out the polymerization in accordance with the following steps: An aqueous dispersion of fine particles of a polyester resin is prepared; vinyl monomers are charged into the dispersion before the polymerization;

and an initiator is then added thereto to effect the polymerization. This process can be carried out without suffering from rapid coalescence and aggregation of fine particles of the polyester resin.

In this manner, polyester resin particles to be used as seed particles in this invention can be prepared on an industrial scale.

In this invention, polyester seed particles prepared as above are swelled with polymerizable monomers in a dispersion medium, and the monomers are polymerized in the seed particles to obtain resin particles having a prescribed diameter.

As is described hereinbefore, if appropriate seed particles are selected, resin particles having a sharp particle size distribution can be obtained in principle by means of seed polymerization, and the diameter of the resulting resin particles can be controlled by changing the swelling rate of the seed particles.

The polyester seed particles according to this invention exhibit an extremely large swelling rate, different from the conventionally employed seed particles consisting of polyvinyl polymers. As a result, polymerizable monomers can be absorbed by polyester seed particles without any limitation, unless swelled particles are deformed or cleaved due to imbalance in their surface tension.

The swelling rate of seed particles in this invention can be in the range of 1 to 1,000, preferably 2 to 2,000 times, more preferably 5 to 1,000 times.

There is no particular restriction on the kind of dispersion medium to be used in this invention. However, the use of water can be preferable from the industrial point of view.

In this invention, any polymerizable monomers can be used, including hydrophilic monomers. It can however be advantageous to use oil-soluble polymerizable monomers since the seed particles can be swelled quite rapidly by such monomers.

Among polymerizable monomers usable in this invention are included vinyl monomers and ring-opening polymerizable monomers.

As examples of usable vinyl monomers, mention may be made of (meth)acrylates, such as alkyl (meth)acrylates containing 1 to 10 carbon atoms in the alkyl moiety, methoxyethyl (meth)acrylate, hydroxyethyl (meth)acrylate, phenyl (meth)acrylate and glycidyl (meth)acrylate; unsaturated ketones, such as methyl vinyl ketone, phenyl vinyl ketone and methyl isopropyl ketone; vinyl esters, such as vinyl formate, vinyl acetate, vinyl propionate and vinyl butyrate; vinyl ethers, such as methyl vinyl ether, ethyl vinyl ether and propyl vinyl ether; halogenated vinyls and vinylidenes; styrene and alkyl- or halogene-substituted derivatives thereof, such as α-methylstyrene and chlorostyrene; allyl alcohol and ethers or esters of allyl alcohol; vinyl aldehydes, such as acrolein and metacrolein; and vinyl cyanides, such as acrylonitrile, methacrylonitrile and vinylidene cyanide. It is also possible to use ionic vinyl monomers, including, for example, unsaturated carboxylic acids, such as acrylic acid, methacrylic acid, maleic acid, itaconic acid, etc., and salts thereof; unsaturated hydrocarbon sulfonic acids, such as vinylsulfonic acid, acrylsulfonic acid, p-styrenesulfonic acid, etc., and salts thereof; double bond-containing phosphoric esters and salts thereof; and basic compounds, such as pyridine, vinyl pyrrolidone, vinyl imidazole, vinyl carbazole, dimethylaminoethyl methacrylate and diethylaminoethyl methacrylate. In addition to these, the above-described cationic group-containing monomers and anionic group-containing monomers can also be used. These monomers can be used either individually or in the form of a mixture of two or more of them.

As examples of usable ring-opening monomers, mention may be made of siloxanes, lactones, lactams and epoxides.

In this invention, there is no particular restriction on the kind of initiators to be used for the polymerization of polymerizable monomers absorbed in the seed particles, and any known initiators can be used therefor.

In accordance with the above steps, there can be obtained substantially spherical resin particles according to this invention. The thus obtained spherical resin particles can be of the order of microns and consisted mainly of a composite of a polyester and a polymer prepared from polymerizable polymers. The average particle diameter (D) of the particles can be from 1 to 500 μm, at least 70% by weight of the particles may have a sphereness of 0.7 or above, and at least 70% by weight of the particles may have a diameter in the range of 0.5 D to 2.0 D.

Since there is no practical limitation on the swelling rate of the seed particles used in this invention, there can be obtained particles of any desired size. In addition, the fine particles prepared in accordance with the invention can be excellent in their property since they can be produced without using swelling agents or the like as in the case of two-step seed polymerization, and hence can be free from undesirable contamination of such agents.

The spherical fine particles according to this invention can be colored to various colors, including white. Such colored particles can be particularly effective as an additive for cosmetics and paints, and as a toner for electrophotography.

There is no particular restriction on the method for coloring the resin particles according to this invention, and any known coloring agents, including pigments, dyes and carbon black, can be used therefor. The coloring agents can be used either individually or in combination of two or more. The use of dyes can be advantageous in obtaining desired spectral transmittance.

In the case where dyes are to be utilized for the coloring, azo, nitro, quinoline, quinophthalone and methine dyes can be advantageous for yellow; anthraquinone, azo and rhodamine dyes can be advantageous for magenta; and anthraquinone dyes can be advantageous for cyan. It can be preferable to use dyes which are in the form of disperse dyes or oil soluble dyes. It is possible to use dyes available in the market as a disperse dye for textile use. Such a dispersed dye can be used as it is. In the case where a dye is available in the form of a concentrated cake, a fine dye dispersion can be prepared therefrom by admixing the cake with a dispersant and an aqueous medium in a ball mill, a sand mill or a shaker, followed by the grinding thereof. Examples of dispersants usable for the preparation include condensation products of naphthalinesulfonates, polystyrenesulfonates, and copolymers of styrene-sulfonates and acrylic acid.

In the case where pigments are to be utilized for the coloring, benzidine and azo pigments can be advantageous for yellow; azo lake, rhodamine and quinacridone pigments can can be used for the production of black toners. Usable carbon blacks include, for example, thermal black, acetylene black, channel black, furnace black and lamp black.

The colored resin particles according to this invention can be effective as a toner, in particular, as a color toner for electrophotography. Such toners may be incorporated with a charge controller so as to control the quantity of static charge.

Toners according to this invention can be additionally incorporated with fluidity modifiers, such as fine particles of alumina and silica. In the case of a one-component developer where toners are used without being mixed with carrier particles, the toners must be magnetic. In such a case, the toners may additionally contain iron, cobalt, nickel, alloys of these metals, or oxides, such as ferrites.

As described hereinbefore, the polyester seed particles can be prepared by using unsaturated carboxylic acids, such as those mentioned hereinbefore. The seed particles can be swelled by using, at least as a part of polymerizable monomers, a monomer containing 2 or more unsaturated bonds and/or reactive functional groups in the molecule. In these cases, cross-linked resin particles can be obtained in accordance with this invention. Such cross-linked particles are heat-resistant and usable as an additive for synthetic polymer films, fibers and other shaped products.

It is also possible to obtain micropore-containing resin particles by removing, with a solvent, part of the polyester component or the polymer component prepared from polymerizable polymers. Such particles can be effective as a separating agent or adsorbent because of their sharp particle size distribution.

Prior porous resin particles have been produced by subjecting a mixture of a pore forming agent (solvent), polymerizable monomers and a cross-linking agent (monomers having two or more unsaturated bonds) to suspension polymerization in an aqueous medium, and then removing the pore-forming agent. The particle size distribution of the thus obtained resin particles becomes inevitably broad since they are formed by means of suspension polymerization.

On the other hand, the micropore-containing resin particles or porous resin particles according to this invention are characterized by a vary sharp particle size distribution since the particles inherit the characteristic of the seed polyester particles.

Micropore-containing particles according to this invention have micropores of a size of mostly 300Å to 10μ and a porocity of 0.1 to 2.0 cc/g, as measured by mercury pressure porocimetry. Porous particles according to this invention have pores of a size of mostly 10 to 300Å and a BET specific surface area of 100 times or more, preferably 200 times or more, most preferably 400 times or more, as measured by nitrogen absorption method.

As monomers having two or more unsaturated groups in the molecule, there can be used polyvinyl aromatic compounds, such as divinylbenzene, trivinylbenzene, divinyltoluene and divinylxylene; polyvinyl heterocyclic compounds, such as divinylpyridine; and compounds having two or more radically polymerizable double bonds, for example, polyvinyl ester compounds, such as ethyleneglycol dimethacrylate and trimethylol trimethacrylate.

In this invention, there can be used pore-forming agents in order to accelerate the formation of pores and/or micropores. As pore-forming agents, there can be used organic solvents, plasticizers and/or linear polymers. Specific examples of usable pore-forming agents include aromatic compounds, such as toluene and benzene; ester compounds, such as ethyl acetate and butyl acetate; alcohols, such as isoamyl alcohol and methyl isobutyl carbinol; saturated hydrocarbons, such as n-heptane and isooctane; halogen-containing solvents, such as dichloroethane and trichloroethylene; plasticizers, such as dioctyl phthalate and dibutyl adipate; and polymers, such as polystyrenes and polyvinyl acetates.

This invention will be explained in further detail by way of examples. It should however be understood that the invention is by no means limited to these. The physical properties shown in the following examples and comparative examples were determined in the following manner.

Number Average Molecular Weight (steam pressure method):
  Measured by a molecular weight measuring apparatus (manufactured by Hitachi Ltd.).
Average Particle Diameter:
  Measured by an automatic particle size distribution measuring apparatus (manufactured by Shimazu Corporation).
Sphereness:
  A particle was projected and the long (major) diameter and the short (minor) diameter of the projected particle was measured under an optical microscope. The sphereness of the particle was calculated therefrom as the ratio of the short diameter to the long diameter; A sphereness of 1.0 means a true sphere, and a sphereness of less then 1.0 means a deformed sphere.

EXAMPLE 1

(1) Production of Polyester Resin

Into an autoclave equipped with a thermometer and a stirrer were charged 94 parts by weight of dimethyl terephthalate, 95 parts by weight of dimethyl isophthalate, 89 parts by weight of ethylene glycol, 80 parts by weight of neopentyl glycol and 80 parts by weight of tetrabutoxy titanate, and the mixture was heated at 120° to 230° C. for 120 minutes to carry out ester exchange reaction. Then, 6.7 parts by weight of 5-sodium sulfoisophthalic acid was added thereto, and the reaction was allowed to proceed for 60 minutes at 220° to 230° C. Thereafter, the temperature of the reaction mixture was raised to 250° C., and the reaction was allowed to continue for additional 1 hour at a pressure of 1 to 10 mmHg, to obtain a copolymerized polyester resin (hereinafter referred to as "A1").

The thus obtained polyester resin (A1) had a molecular weight of 2,700 and contained 118 equivalents/$10^6$ g of sulfonic acid's metal bases. (The amount of the sulfonic acid's metal bases was determined by measuring the concentration of sulfur in the copolymerized polyester resin.) According to NMR analysis, the polyester resin (A1) was consisted of the following acid components:

| | |
|---|---|
| terephthalic acid | 48.5 mol %; |
| isophthalic acid | 49.0 mol %; and |
| 5-sodium sulfoisophthalic acid | 2.5 mol % |
| and the following alcohol components: | |
| ethylene glycol | 61.0 mol %; and |
| neopentyl glycol | 39.0 mol %. |

(2) Production of Polyester Seed Particles

Into a four-necked 1 liter separable flask equipped with a thermometer, a condenser and a stirrer were placed 34 parts by weight of the polyester resin (A1) and 10 parts by weight of butyl cellosolve, and the mixture was dissolved at 110° C. Thereafter, 56 parts by weight of water (80° C.) was added thereto, and an aqueous dispersion (B1) of the copolymerized polyester was prepared therefrom. The dispersant contained in the thus obtained dispersion had an average diameter of 0.1 $\mu$m or less.

Into a four-necked 1 liter separable flask equipped with a thermometer, a condenser and a stirrer were charged 834 parts by weight of the aqueous polyester dispersion (B1), 800 parts by weight of deionized water and 5.6 parts by weight of dimethylaminoethyl methacrylate, and the temperature of the mixture was raised to 70° C. Then, 100 parts by weight of an aqueous solution containing 0.2 parts by weight of ammonium persulfate was dropped over a period of 30 minutes, and the reaction was allowed to proceed for additional 20 minutes at 70° C., whereby the polyester particles of the order of submicrons present in the aqueous polyester dispersion grew to yield polyester particles (C1) having an average particle diameter (D) of 0.92 $\mu$m, the occupation percentage (based on weight) of particles having a diameter in the range of 0.5 D to 2 D being 94%.

(3) Seed Polymerization

Water was added to the thus obtained polyester particles (C1) to obtain an aqueous 0.2 wt. % dispersion (D1) of the polyester particles.

To 100 parts by weight of the aqueous polyester dispersion (D1) was added a solution prepared by dissolving 1 part by weight of 2,2'-azobis(2,4-dimethylvaleronitrile) (initiator) into 20 parts by weight of methyl methacrylate (monomer), and the resulting mixture was gently stirred for 20 minutes, whereby the polyester resin particles contained in the aqueous dispersion were swelled with the monomer to an average diameter of 9.2 $\mu$m (swelling rate=1,000 times). Then, the temperature of the mixture was raised to 60° C., and the polymerization was allowed to proceed for 3 hours.

The thus obtained resin particles were consisted mainly of polymethyl methacrylate and contained ca. 0.1% of polyester components. The particles had an average diameter (D) of 9.2 $\mu$m and were substantially spherical, i.e., not less than 94% (based on weight) of the particles had a sphereness of 0.7 or above. The particles also had a sharp particle size distribution, and not less than 92% (based on weight) of the particles had a diameter (D) in the range of 0.5 D to 2.0 D.

EXAMPLE 2

Into 10 parts by weight of butyl cellosolve was dissolved at 110° C. 34 parts by weight of the polyester resin (A1) prepared in Example 1. To this solution was added 56 parts by weight of water of 80° C., and an aqueous microdispersion of the polyester resin was prepared therefrom which contained particles having an average diameter of ca. 0.1 $\mu$m. The thus obtained aqueous microdispersion was distilled in a distilling flask until the temperature of the distillate reached 100° C. After cooling, water was added thereto to obtain an aqueous polyester dispersion (B2) having a solid content of 30% by weight.

Into a four-necked 1 liter separable flask equipped with a thermometer, a condenser and a stirrer were charged 834 parts by weight of the aqueous dispersion (B2), 3.2 parts by weight of a copolymer of sodium salt of p-sulfostyrene and acrylic acid, and 5.6 parts by weight of dimethylaminoethyl methacrylate. The temperature of the mixture was raised to 70° C., and the mixture was stirred for additional 3 hours, whereby the particles of the order to submicrons contained in the aqueous polyester dispersion grew to yield polyester particles (C2) having an average diameter (D) of 4.8 $\mu$m, the occupation percentage (based on weight) of particles having a diameter in the range of 0.5 D to 2 D being 95%.

The thus obtained polyester particles (C2) were filtered, washed with water and then redispersed into water to give an aqueous 12 wt. % dispersion (D2) of the polyester particles.

To 1,000 parts by weight of the aqueous polyester dispersion (D2) was added a solution prepared by dissolving 1 part by weight of 2,2'-azobis(2,4-dimethylvaleronitrile) into 120 parts by weight of methyl methacrylate, and the resulting mixture was stirred gently for 60 minutes, whereby the polyester particles contained in the aqueous dispersion were swelled to an average diameter of 6.0 $\mu$m (swelling degree=2.0 times). Then, the temperature of the mixture was raised to 60° C., and the polymerization was allowed to proceed for 3 hours to obtain composite resin particles (R1). In the thus obtained composite resin particles were contained polymethyl methacrylate and the copolymerized polyester resin at a ratio (based on weight) of 50/50. The particles had an average diameter of 5.98 $\mu$m, and their particle size distribution was similar to that of the polyester particles (C2), and the occupation percentage (based on weight) of particles having a diameter in the range of 0.5 D to 2 D was 93%.

From the resin particles was prepared an aqueous dispersion having a solid content of 25%. Into the stainless pot of a dyeing tester ("Minicolor" manufactured by Texam Giken K.K.) were charged 100 parts by weight of the above dispersion and 3 parts by weight (reduced to concentrated cake) of yellow dye. The temperature of the mixture was raised from room temperature to 130° C. at a rate of 3° C./min., maintained at 130° C. for 60 minutes and then allowed to drop to room temperature. The dyed particles were filtered, washed and then dried by a spray drier to give yellow resin particles (SY2).

In the above dying operation was used C.I. Disperse Yellow 198 (Miketone Polyester Yellow 5GF) [product of Mitsui Toatsu Senryo K.K.].

The above procedure was repeated by using C.I. Disperse Red 11 (Miketone Fast Pink FF3B) [product of Mitsui Toatsu Senryo K.K.] as a magenta dye, or C.I. Disperse Blue 7 (Miketone Fast Turquoise Blue G) [product of Mitsui Toatsu Senryo K.K.] as a cyan dye, to give resin particles (EM2) colored to magenta or resin particles (EC2) colored to cyan, respectively.

Two-component developing agents were prepared therefrom, whereby the colored resin particles (EY2, EM2 or EC2) were used as toners by being admixed with a carrier of Ferrite Beads F-100 (product of Powder Tec Co.) at a weight ratio of: toner/carrier=5/100.

The developing agents were set in a color electrophotographic copier utilizing amorphous silicon as the photosensitive material, and 5,000 paper copies were produced consecutively. The thus obtained copies were free from fogs and thin spots, and the images were sharp and clear. The images formed were smooth in the change of hue in intermediate color areas. Even in low density areas, intermediate color tones could be reproduced with fine and smooth surface characteristics.

Using the same dolor developing agents, images were reproduced on transparent films for overhead projectors. The copies obtained were excellent in spectral transmittance, and the images projected on the screen by an overhead projector were free from turbidity and showed clear color tone. The resolution of the images was 16 lines/mm or above.

EXAMPLE 3

Into a four-necked 1 liter separable flask equipped with a thermometer, a condenser and a stirrer were placed 834 parts by weight of the aqueous polyester dispersion (B2) prepared in Example 2, 3.2 parts by weight of a copolymer of sodium salt of p-sulfostyrene and acrylic acid, and 5.6 parts by weight of dimethylaminoethyl methacrylate. The temperature of the mixture was raised to 70° C., and the stirring was continued for 6 hours, whereby the particles of the order of submicrons contained in the dispersion grew to yield polyester particles (C3) having an average diameter (D) of 16.8 μm, the occupation percentage (based on weight) of particles having a diameter in the range of 0.5 D to 2 D being 94%.

The thus obtained polyester particles (C3) were filtered, washed and redispersed into water to give an aqueous 10 wt. % dispersion (D3) of the polyester particles.

To 1,000 parts by weight of the aqueous polyester dispersion (D3) were added 5 parts by weight of benzoyl peroxide, 20 parts by weight of styrene and 80 parts by weight of divinyl benzene (purity =67.4%), and the resulting mixture was gently stirred at 25° C. for 60 minutes, whereby the polyester particles contained in the dispersion swelled to an average diameter of 21 μm (swelling degree=2 times). Then, the atmosphere in the reaction system was replaced with nitrogen, the temperature of the mixture was raised to 80° C., and polymerization was allowed to proceed for 8 hours. After having been cooled to room temperature, the resulting reaction mixture was filtered. The thus obtained cross-linked resin particles (50 parts by weight) was added to 950 parts by weight of methyl ethyl ketone, and the resulting mixture was heated under reflux for 3 hours, thereby dissolving and removing the polyester resin. After the reflux, the resulting crosslinked resin particles were dried at 95° C. and subjected to NMR analysis. There were also determined the particle size distribution of the particles and the porocity of the particles. The porosity was determined by the BET method by means of adsorption of nitrogen, using Sorptomatic SSII-80 manufactured by Carlo Erba Co. Results obtained were as follows:

| Composition of the Resin Particles: | |
| --- | --- |
| Cross-linked styrene polymer | 94 wt % |
| Residue of polyester polymer | 6 wt % |
| Apparent Average Diameter (D): | 21 μm |
| Occupation Percentage of Particles Having a Diameter in the Range of 0.5 D to 2 D: | 90 wt % |
| Specific Surface Area: | 580 m²/g |
| Porocity: | 0.52 cc/g |

EXAMPLE 4

To 1,000 parts by weight of the aqueous polyester dispersion (D3) prepared in Example 3 were added 5 parts by weight of benzoyl peroxide, 10 parts by weight of styrene weight of benzoyl peroxide, 10 parts by weight of styrene and 90 parts by weight of divinyl benzene (purity=67.4%). To this was additionally added 25 parts by weight of toluene (pore-forming aid). The resulting mixture was treated in the same manner as in Example 3.

The cross-linked resin particles obtained were analyzed and evaluated in the same manner as in Example 3. The results obtained were as follows:

| Composition of the Resin Particles: | |
| --- | --- |
| Cross-linked styrene polymer | 94 wt % |
| Residue of polyester polymer | 6 wt % |
| Apparent Average Diameter (D): | 21 μm |
| Occupation Percentage of Particles Having a Diameter in the Range of 0.5 D to 2 D: | 90 wt % |
| Specific Surface Area: | 580 m²/g |
| Porocity: | 0.52 cc/g |

EXAMPLE 5

To 1,000 parts by weight of the aqueous polyester dispersion (D3) prepared in Example 3 were added 5 parts by weight of benzoyl peroxide, 70 parts by weight of styrene and 30 parts by weight of divinyl benzene (purity=67.4%). The resulting mixture was treated in the same manner as in Example 3.

The porocity of the cross-linked resin particles obtained was determined by the mercury pressure porocimetry, using Mercury Pressure Porocimeter Series-200, manufactured by Carlo Ebra Co. In this determination, mercury was pressurized up to $2.0 \times 10^8$ Pa. Other characteristics of the particles were determined in the same manner as in Example 3. Results obtained were as follows:

| Composition of the Resin Particles: | |
| --- | --- |
| Cross-linked styrene polymer | 90 wt % |
| Residue of polyester polymer | 10 wt % |
| Apparent Average Diameter (D): | 21 μm |
| Occupation Percentage of Particles Having a Diameter in the Range of 0.5 D to 2 D: | 90 wt % |
| Porocity: | 1.2 ml/g |

EXAMPLE 6

Into an autoclave equipped with a thermometer and a stirrer were charged 140 parts by weight of dimethyl terephthalate, 48 parts by weight of dimethyl isophthalate, 6 parts by weight of dimethyl sodium sulfoisophthalate, 109 parts by weight of ethylene glycol, 39 parts by weight of tricyclodecane dimethylol and 0.1 parts by weight of tetrabutoxy titanate, and the resulting mixture was heated at 180° to 230° C. for 120 minutes to carry out ester exchange reaction. Then, the temperature of the reaction system was raised to 250° C., and the reaction was continued for 60 minutes at a pressure of 1 to 10 mmHg, to give a copolymerized polyester resin (A6). According to NMR analysis, the thus obtained polyester resin (A6) was consisted of the following acid components:

| | |
|---|---|
| terephthalic acid | 72.7 mol %; |
| isophthalic acid | 24.8 mol %; and |
| sodium sulfoisophthalic acid | 2.5 mol % |
| and the following alcohol components: | |
| ethylene glycol | 78.8 mol %; and |
| tricyclodecane dimethylol | 21.2 mol %. |

Into 10 parts by weight of butyl cellosolve was dissolved at 110° C. 34 parts by weight of the copolymerized polyester resin (A6). Then, 56 parts by weight of water was added thereto to obtain an aqueous microdispersion containing polyester resin particles having an average diameter of ca. 0.1 μm. The thus obtained aqueous microdispersion was placed in a distilling flask and subjected to distillation until the temperature of the distillate reached 100° C. After cooling, water was added thereto up to a solid content of 30%.

Into a four-necked 1 liter separable flask equipped with a thermometer, a condenser and a stirrer were charged 300 parts by weight of the aqueous polyester microdispersion, 4.0 parts by weight of polyacrylic acid and 15 parts by weight of dimethylaminoethyl methacrylate, and the temperature of the mixture was raised to 70° C. Subsequently, 150 parts by weight of an aqueous solution containing 0.1 parts by weight of ammonium persulfate was dropped thereto over a period of 60 minutes, and the reaction was continued for additional 60 minutes at 70° C., whereby the particles of the order of submicrons contained in the microdispersion coalesced and grew to yield particles having an average diameter (D) of 7.3 μm, the occupation percentage (based on number) of particles having a diameter in the range of 0.5 D to 2 D being 95%. According to NMR and FTIR analyses, the composition of thus obtained polyester particles was as follows:

polyester components: 98.4%
vinyl polymer components: 1.6%

The thus obtained polyester particles were filtered, washed with water and redispersed into water to obtain an aqueous 10 wt. % dispersion (D6) of the polyester particles. The particles were then dyed in the same manner as in Example 2 to give colored resin particles (EY6, EM6 and EC6).

Two-components developing agents were prepared from the resin particles (EY6, EM6 and EC6), whereby the resin particles were used as toners by being admixed with Ferrite Beads F-100 (product of Powder Tec Co.) [carrier] at a weight ratio of: toner/carrier=5/1.

The developing agents were set in a color electrophotographic copier utilizing amorphous silicon as the photosensitive material, and 5,000 paper copies were produced consecutively. The thus obtained copies were free from fogs and spots, and the images were sharp and clear. The images formed were smooth in the change of hue in intermediate color areas. Even in low density areas, intermediate color tones could be reproduced with fine and smooth surface characteristics.

Using the same color developing agents, images were reproduced on transparent films for overhead projectors. The copies obtained were excellent in spectral transmittance, and the images projected on the screen by an overhead projector were free from turbidity and showed clear color tone. The resolution of the images was 16 lines/mm or above.

To 1,000 parts by weight of the aqueous polyester dispersion (D6) were added 0.5 parts by weight of benzoyl peroxide, 16 parts by weight of styrene and 4 parts by weight of divinyl benzene (purity=67.4%), and the resulting mixture was stirred gently at 25° C. for 60 minutes. Then, the atmosphere in the reaction system was replaced with nitrogen, the temperature of the mixture was raised to 80° C., and polymerization was allowed to proceed for 4 hours. After having been cooled to room temperature, the resulting reaction mixture was filtered. The thus obtained resin particles had an average diameter (D) of 7.5 μm, the occupation percentage (based on number) of particles having a diameter in the range of 0.5 D to 2 D being 95%. The resin particles were dyed in the same manner, and the colored particles were used as toners for electrophotography. There could be obtained excellent images. The toners were characterized by the broadness in their upper fixing limits.

EXAMPLE 7

Into an autoclave equipped with a thermometer and a stirrer were charged 151 parts by weight of dimethylterephthalate, 149 parts by weight of dimethylisophthalate, 15 parts by weight of dimethyl sodium sulfoisophthalate, 149 parts by weight of ethylene glycol, 166 parts by weight of neopentyl glycol and 0.1 parts by weight of tetrabutoxy titanate, and the resulting mixture was heated at 220° C. for 120 minutes to carry out ester exchange reaction. Then, the temperature of the reaction system was raised to 180° C., and 39 parts by weight of maleic acid and 0.1 parts by weight of hydroquinone were added thereto. The temperature of the reaction system was raised to 200° C., and the reaction was allowed to proceed for 60 minutes. Subsequently, the temperature of the reaction system was raised to 220° to 240° C., and the reaction was continued for additional 60 minutes at a pressure of 1 to 10 mmHg, to give a copolymerized polyester resin (A7) containing unsaturated groups.

Into 10 parts by weight of butyl cellosolve was dissolved at 110° C. 34 parts by weight of the polyester resin (A7), and 56 parts by weight of water was added thereto to obtain an aqueous microdispersion containing polyester resin particles having an average diameter of ca. 0.1 μm. The thus obtained aqueous microdispersion was placed in a distilling flask and subjected to distillation until the temperature of the distillate reached 100° C. After cooling, water was added thereto up to a solid content of 30% to give an aqueous dispersion (B7) of the copolymerized polyester resin.

Into a four-necked 1 liter separable flask equipped with a thermometer, a condenser and a stirrer were charged 834 parts by weight of the aqueous polyester dispersion (B7), 3.2 parts by weight of a copolymer of sodium salt of p-sulfostyrene and acrylic acid, and 5.6 parts by weight of dimethylaminoethyl methacrylate. The temperature of the resulting mixture was raised to 70° C., and the stirring was continued for 3 hours, whereby particles of the order of submicrons contained in the aqueous polyester dispersion grew to yield particles (C7) having an average diameter (D) of 6.4 μm, the occupation ratio (based on weight) of particles having a diameter in the range of 0.5 D to 2 D being 97%.

The thus obtained polyester particles (C7) were filtered, washed and redispersed into water to obtain an aqueous 12 wt. % dispersion (D7) of the polyester particles.

To 1,000 parts by weight of the polyester particles (D7) were added 5 parts by weight of benzoyl peroxide, 70 parts by weight of styrene and 50 parts by weight of ethyl methacrylate (monomer), and the resulting mixture was stirred gently for 60 minutes. Subsequently, the temperature of the mixture was raised to 60° C., and polymerization was allowed to proceed for 4 hours, to give cross-linked polyester resin particles. The thus obtained particles had an average diameter (D) of 7.9 μm, and the occupation percentage (based on weight) of particles having a diameter in the range of 0.5 D to 2 D was 95%.

COMPARATIVE EXAMPLE

(1) Production of Polyacryl Seed Particles

Into an autoclave were charged 190 parts by weight of methyl methacrylate, 10 parts by weight of sodium p-styrene-sulfonate and 1,181 parts by weight of water. After 2.5 parts by weight of di-t-butyl peroxide had been additionally added, the autoclave was tightly closed, and polymerization was allowed to proceed with stirring for 10 minutes at a temperature of 160° C. After the completion of the reaction, the reaction mixture was cooled with continued stirring to ca. 90° C., to give particles of polymethyl methacrylate having an average diameter (D) of 0.86 μm. The particles so formed were substantially spherical, and the occupation percentage of particles having a diameter in the range of 0.5 D to 2 D was 90%.

(2) Seed Polymerization

Water was added to the above-prepared polymethyl methacrylate particles to obtain an aqueous 0.2 wt. % dispersion. To 100 parts by weight of the aqueous dispersion was added with stirring a solution prepared by dissolving 1 part by weight of 2,2'-azobis(2,4-dimethylvaleronitrile) [initiator] into 20 parts by weight of methyl methacrylate [monomer]. After being stirred for additional 20 minutes, the reaction mixture was heated to 60° C., and polymerization was allowed to proceed for 3 hours. The thus obtained particles were substantially spherical and had an average particle size (D) of 3.54 um. However, the particle size distribution of the particles was broad, and the occupation percentage of particles having an average diameter in the range of 0.5 D to 2 D was 47%.

As described hereinabove, this invention makes it possible to produce at a large scale resin particles which are excellent in sphereness, may have any desired diameter and can be provided with a sharp particle size distribution.

What is claimed is:

1. A method for producing resin particles, which comprises preparing substantially spherical resin particles which have an average particle diameter of 0.1 to 50 μm, at least 70% by weight of said particles having a diameter in the range of 0.5 to 2.0 times the average particle diameter and which comprise a polyester; dispersing the substantially spherical resin particles in an aqueous medium; swelling said resin particles with a polymerizable monomer comprising a vinyl monomer and/or a ring-opening polymerizable monomer wherein the swelling rate of said polyester containing particles is at least 1.08 times; and then polymerizing said monomer to form resin particles having an average particle diameter of 1 to 500 μm, at least 70% by weight of the particles have a sphereness of 0.7 or above, and at least 70% by weight of the particles have a diameter in the range of 0.5 to 2.0 times the average particle diameter and comprising said polyester and a polymer formed from said polymerizable monomer.

2. A method as claimed in claim 1, wherein the polyester in said particles contain ionic groups.

3. A method as claimed in claim 1 or 2, wherein the polyester in said seed particles contain polymerizable unsaturated bonds.

4. A method as claimed in claim 1, wherein said polymerizable monomer has at least two polymerizable unsaturated bonds and/or reactive functional groups in the molecule.

5. A method as claimed in claim 1, wherein part of the polymer component constituting said resin particles is extracted with a solvent.

6. A method as claimed in claim 1, wherein part or whole of the medium and/or polymer components contained in said resin particles are removed.

7. A seed polymerizing method for producing resin particles, which comprises preparing substantially spherical resin particles which have an average particle diameter of 0.1 to 50 μm, and at least 70% by weight of the particles have a diameter in the range of 0.5 to 2.0 times the average particle diameter and which comprise a polyester; dispersing the substantially spherical resin particles in an aqueous medium; swelling said resin particles with a polymerizable monomer comprising a vinyl monomer and/or a ring-opening polymerizable monomer wherein the swelling rate of said polyester containing particles is in the range of 1.08–1000 times; and then polymerizing said monomer to form resin particles having an average particle diameter of 1 to 500 μm, at least 70% by weight of the particles have a sphereness of 0.7 or above, and at least 70% by weight of the particles have a diameter in the range of 0.5 to 2.0 times the average particle diameter and comprising said polyester and a polymer formed from said polymerizable monomer.

* * * * *